Aug. 26, 1947. A. W. MASSECAR 2,426,364
AUTOMATIC SHUT OFF VALVE
Filed Aug. 14, 1945 2 Sheets-Sheet 1

Inventor:
Albrey W. Massecar,
by: T. G. Bradbury.
Attorney

Aug. 26, 1947.  A. W. MASSECAR  2,426,364
AUTOMATIC SHUT OFF VALVE
Filed Aug. 14, 1945  2 Sheets-Sheet 2

Inventor:
Albrey W. Massecar,
by: [signature]
Attorney

Patented Aug. 26, 1947

2,426,364

UNITED STATES PATENT OFFICE 2,426,364

AUTOMATIC SHUTOFF VALVE

Aubrey W. Massecar, Huntington Park, Calif., assignor to Ester Muriel Massecar, Los Angeles, Calif.

Application August 14, 1945, Serial No. 610,705

3 Claims. (Cl. 137—153)

This invention relates to an automatic shut off valve which is designed to safeguard gas consumers against the constant danger to which gas equipped homes and other buildings are exposed. It is therefore a safety device that shuts off the supply of gas at the first approach of danger and prevents it being turned on again until the cause of danger has been removed. It cannot be left open unless all pipe openings in the system with which my improvement is used are closed and the whole system is in safe working condition.

An object of my invention is to provide means for automatically shutting off the supply of gas in a consumer's gas system immediately when the normal pressure of gas in the system increases or decreases a predetermined degree due to a leak in the system or if the supply of gas is interrupted or for any other cause.

Another object is the production of gas shut off means which will not permit the supply of gas until any defect in a system which will cause my improved shut off valve to function has been removed or corrected.

Another object is the production of automatic valve shut off means which will act quickly and which is dependable in operation to shut off the supply of gas instantly whenever the normal pressure in the gas system varies either above or below normal operating range.

Another object of the invention is maximum simplicity of construction and effectiveness in operation.

Among still further objects is the production of an automatic valve shut off which is precise in operation, inexpensive in construction and easy to manufacture.

To these ends my invention comprises the features of construction and combination of parts hereinafter described and claimed.

Figure 1:
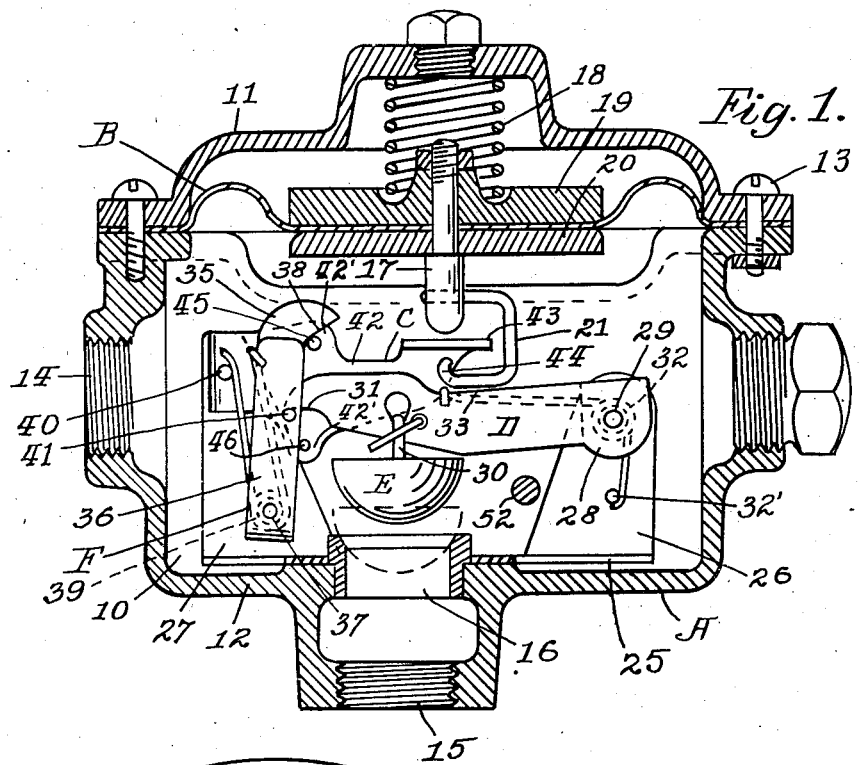
Figure 2:
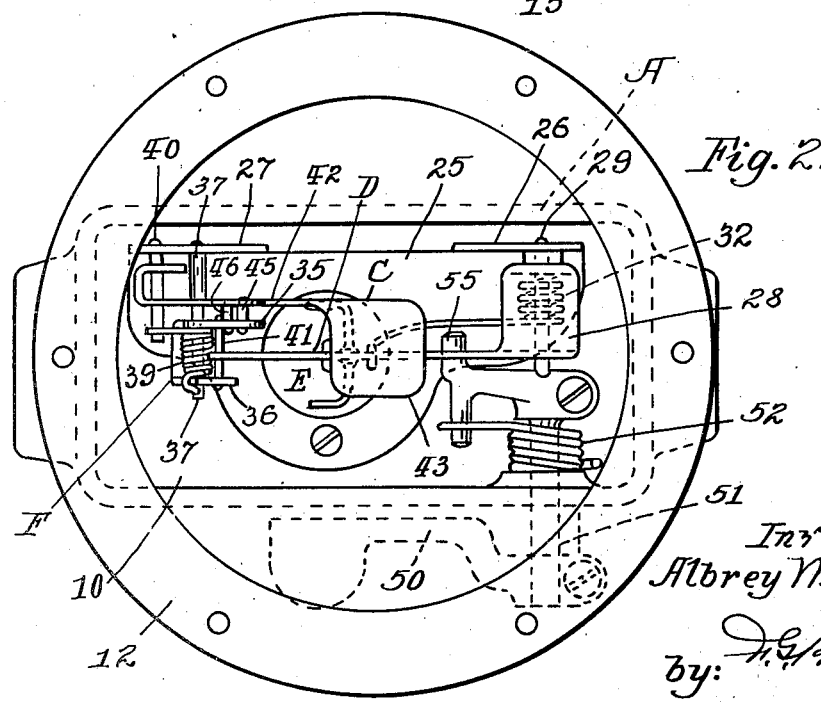
Figure 4:
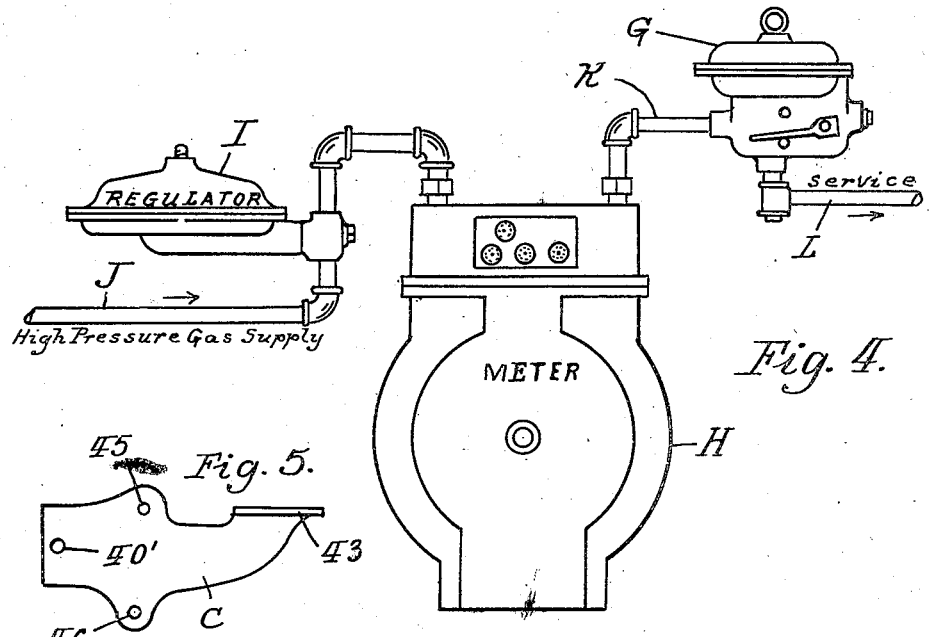
Figure 5:
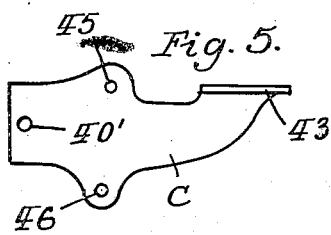
Figure 3:
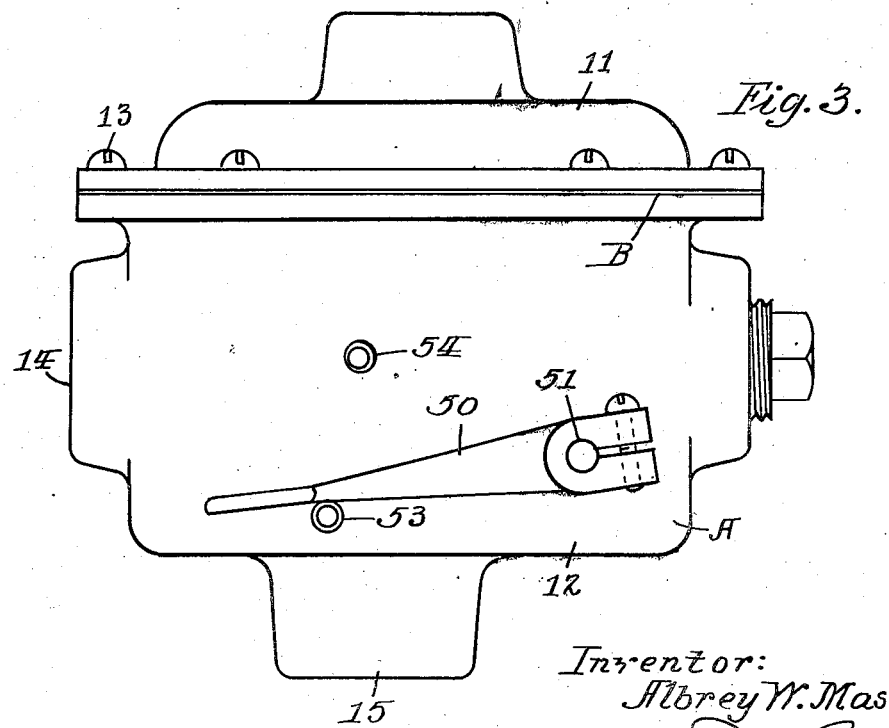

In the drawings forming part of this specification, Fig. 1 is a central vertical section of my improved automatic shut off valve; Fig. 2 is a plan of the valve control means when the upper section of the housing and diaphragm are removed; Fig. 3 is a side elevation of my improved automatic shut off valve; Fig. 4 is a view showing my improved automatic shut off valve coupled into a portion of a gas supply system such as is commonly used for supplying gas from a central supply station or plant to a consumer, and Fig. 5 is a side elevation of the latch release C.

In the drawings and with particular reference to Figs. 1 to 3 inclusive, A indicates a housing forming a gas chamber 10 therein; said housing being split into two upper and lower sections 11 and 12 which are secured together and closed by suitable fastening means such as screws 13. The housing is provided with a gas threaded inlet 14 entering the gas chamber and a threaded outlet 15. An orifice fitting 16 having a valve seat is placed in the outlet and a valve E is adapted to raise and lower into open or closed position in cooperation with said seat.

My improvement provides a control mechanism for the valve which is influenced by the fluctuation of gas pressure which is impressed upon a flexible diaphragm B. This diaphragm is secured tightly between the upper and lower sections of the housing. The normal range of pressure of gas in the gas chamber tends to retain the diaphragm in median or neutral position as shown in Fig. 1 against the tension of a helical spring 18, the latter being impressed between the upper wall portion of the upper section of the housing and the disk sections 19 and 20 which are clamped on the diaphragm. A stud 17 is mounted on the central portions of the disk sections and projects downwardly into the central portion of the gas chamber and carries on its lower end a yoke member 21 for controlling the operation of the latch release C to be hereinafter described.

My improved valve control mechanism has a base frame 25 which is secured over the orifice fitting 16 on the floor of the housing. This base frame has two upward flange supports 26 and 27. A valve arm D is formed with a flanged hub portion 28 which is hinged by the pintle 29 upon the flange support 26 so that said arm may swing up and down. The valve E is freely hung by the coupling 30 from the outer end portion of the valve arm and is adapted to open or close by the free up and down movement of said arm. The free end of the valve arm is formed with a latch engaging shoulder 31 as will be hereinafter described. A coil spring 32 retained around the pintle 29 has one end bearing against a fixed pin 32' on the flange support 26 and its opposite end engaged over the upper edge 33 of the valve arm so as to normally urge the valve E downwardly into closed position upon its seat in the orifice fitting 16.

A latch F having two upwardly extending flange arms 35 and 36 is hinged at its lower end portion by the pintle 37 on the flange support 27. The upper end of the arm 35 is provided with a lower edge 38 which inclines upwardly and inwardly. A coil spring 39 which is retained by the pintle 37 has one end member engaged over the back edge of the arm 36 and its opposite end member engaged against the pintle member 40 upon which the latch release C is hinged through its journal opening 40' (Fig. 5). The latch F is provided with a transverse catch 41 which is so arranged as to engage below the shoulder 31 on the free end of the valve arm D in the inwardly inclined position of the latch and in the raised position of the valve arm to normally retain the valve E in open position.

To release the latch and permit the valve to close automatically through the effort of spring 32 when the gas pressure in the gas chamber increases above or decreases below the normal range of pressure, the latch release C is provided with double releasing means. The latch release resembles a trip arm 42 which is swung on the fixed pintle 40, said pintle being supported by the base flange 27. The free end of the trip arm is formed with a substantially horizontal flange 43 which is normally maintained freely between the lower end of the stud 17 and the upturned end 44 of the yoke 21. The trip arm is provided with suitable upper and lower lobes 42' to the sides of which horizontal latch trip pins 45 and 46 are secured above and below the pintle 40. Normally the upper pin 45 rests against the upwardly inclined edge 38 of the latch arm 35 while the lower pin 46 rests against its forward side edge, whereby the latch release C is retained in normal position substantially midway between the lower end of the stud 17 and the upturned end 44 of the yoke 21. Any variation in pressure of the gas above or below normal thus varies the vertical position of the diaphragm B, which in turn tilts the latch release C up or down. This movement is transmitted to the latch F by either of the latch release elements 45 or 46, thus releasing the valve arm D and the valve E into lower closed position and checking the flow of gas through the outlet 15.

The construction thus provided is highly sensitive in action, the function of closing the valve being substantially instantaneous. It is therefore plainly evident that the valve can not be left open unless the pressure on the diaphragm is above or below the neutral pressure limit, in which event the supply of gas is checked by the snap action of the control means provided by my improvement.

The valve can be reset into open position after the device functions and the supply of gas is returned to normal condition by the operation of a manually operable arm 50, shown in Figs. 2 and 3 outside of the housing and which is secured to a shaft 51. This shaft is provided in the wall of the housing and has on its inner end a crank arm 55 which is freely disposed and spaced below the lower edge of the valve arm D in position to raise the arm into upper position with its shoulder 31 engaged by the catch 41. A coil spring 52 serves to return the crank arm, including the shaft 51 and manual operating arm 50 to normal position. Stops 53 and 54 define the throw of the operating arm.

In Fig. 4 I have shown my improved automatic shut off valve G connected in a gas supply system including the usual gas meter H and gas regulator I, the high pressure supply being furnished by duct J. The connection between the meter and the inlet of valve G is provided by the piping K and the gas service from the outlet is shown indicated by piping L. The apparatus with which my improved automatic shut off valve as shown in Fig. 4 illustrates one of many systems or means with which my invention is applicable for automatically controlling the supply of fluid in the event of a change of pressure above or below normal.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the spirit thereof and without departing from the scope of the following claims.

I claim:

1. A shut off valve having a housing forming a gas chamber and having inlet and outlet openings, a valve adapted to control said outlet opening, a diaphragm in said chamber influenced by the gas pressure therein and having a yoke, a valve arm hinged in said housing and connected to respectively open or close said valve in relation to said outlet opening, a spring normally tending to urge said valve arm into closed position, a latch having a stop and hinged to releasably engage and hold the free end of said arm and the valve in normal open position, a spring urging said latch with its stop engaged with said arm, a trip lever hinged to swing with its free end engaged by said yoke through movement of said diaphragm, said trip lever having a pair of actuating elements disposed on opposite sides of its hinge connection to engage and release the valve arm by the swinging movement of said trip lever in either direction when said yoke is reciprocated by excessive or decreased gas pressure in the gas chamber.

2. In a structure as defined in claim 1, a reset for returning the valve and its control into raised position, having a crank arm journaled in said housing and provided with a member in the gas chamber positioned to releasably engage and return the valve and its control into raised open position by the rotation of the crank arm, and a hand operating element outside said housing for rotating the crank arm.

3. An automatic shut off valve comprising a housing which forms a gas chamber having an inlet and an outlet, a valve adapted to control the opening and closing of said outlet, a diaphragm in said chamber influenced to reciprocate by changes in pressure of gas therein and having trip engaging means, a valve arm movably supported in said chamber and connected to open or close said valve, resilient means tending to urge said arm and said valve to close said outlet opening, a latch movably supported to releasably engage said arm and permit the valve to close, a trip hinged in said housing and adapted to be reciprocated by engagement with said trip engaging means when said diaphragm is reciprocated by change in gas pressure in said chamber either above or below normal, said trip having double latch engaging means adapted to cause disengagement of said latch from said valve arm to release the valve into closed position when gas in said chamber either increases or decreases above or below normal pressure.

AUBREY W. MASSECAR.